US012768633B2

(12) United States Patent
Luo et al.

(10) Patent No.: US 12,768,633 B2
(45) Date of Patent: Oct. 20, 2026

(54) ALIGNMENT TARGET AND FOUR-WHEEL ALIGNMENT SYSTEM

(71) Applicant: Autel Intelligent Technology Corp., Ltd., Shenzhen (CN)

(72) Inventors: Wenhui Luo, Shenzhen (CN); Yanmin Dai, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 476 days.

(21) Appl. No.: 18/283,217

(22) PCT Filed: Mar. 1, 2022

(86) PCT No.: PCT/CN2022/078687
§ 371 (c)(1),
(2) Date: Sep. 21, 2023

(87) PCT Pub. No.: WO2022/199340
PCT Pub. Date: Sep. 29, 2022

(65) Prior Publication Data

US 2024/0175669 A1 May 30, 2024

(30) Foreign Application Priority Data

Mar. 24, 2021 (CN) ......................... 202110316136.3

(51) Int. Cl.
*G01B 5/255* (2006.01)

(52) U.S. Cl.
CPC ........ *G01B 5/255* (2013.01); *G01B 2210/306* (2013.01)

(58) Field of Classification Search
CPC .............. G01B 5/255; G01B 2210/306; G01B 11/2755; G01B 2210/30; G01B 5/0025
See application file for complete search history.

(56) References Cited

U.S. PATENT DOCUMENTS 6,323,776 B1 * 11/2001 Jackson ............... G05B 19/401 382/172
7,295,297 B2 * 11/2007 Burns ................ G01B 11/2755 356/139.09

(Continued)

FOREIGN PATENT DOCUMENTS

CN 205580754 U 9/2016
CN 208968473 U * 6/2019

(Continued)

OTHER PUBLICATIONS

The extended European Search Report of EP Patent Application No. 22774002.4 issued on Jul. 17, 2024.

(Continued)

*Primary Examiner* — Yaritza Guadalupe-Mccall
(74) *Attorney, Agent, or Firm* — Andrew C. Cheng

(57) ABSTRACT

An alignment target includes: a target plate, the target plate being provided with a position indication pattern configured for indicating position information of the alignment target; a flexible protective member, the flexible protective member being arranged around the periphery of the target plate; and a housing, the housing comprising a main body portion and a frame arranged around the periphery of the main body portion, the frame enclosing an accommodating space, the target plate and the flexible protective member being disposed in the accommodating space, the flexible protective member being located between the target plate and the housing, and configured for buffering an interaction force between the housing and target plate. In this way, according to the embodiments of the present invention, the problem of deformation or even breakage of the target due to vibration, collision or falling is avoided, and the service life of a product is prolonged.

8 Claims, 6 Drawing Sheets

(56) References Cited

U.S. PATENT DOCUMENTS

| | | | | |
|---|---|---|---|---|
| 7,373,726 | B2 * | 5/2008 | Jackson | G01B 11/2755<br>33/203.18 |
| 2007/0101595 | A1 * | 5/2007 | Jackson | G01B 11/2755<br>33/293 |
| 2019/0293415 | A1 * | 9/2019 | D'Agostino | G01B 11/2755 |
| 2021/0156680 | A1 * | 5/2021 | Luo | G01B 21/042 |
| 2024/0175669 | A1 * | 5/2024 | Luo | G01B 5/255 |

FOREIGN PATENT DOCUMENTS

| | | | | | |
|---|---|---|---|---|---|
| CN | 111076660 | A | | 4/2020 | |
| CN | 111829461 | A | | 10/2020 | |
| CN | 111879263 | A | * | 11/2020 | G01B 11/275 |
| CN | 112945068 | A | * | 6/2021 | G01B 11/2755 |
| EP | 1949146 | B1 | | 3/2013 | |
| JP | 2001255118 | A | | 9/2001 | |

OTHER PUBLICATIONS

International Search Report of PCT Patent Application No. PCT/CN2022/078687 issued on May 17, 2022.

* cited by examiner

ALIGNMENT TARGET AND FOUR-WHEEL ALIGNMENT SYSTEM

CROSS-REFERENCE TO RELATED APPLICATIONS

The present application is the National Stage application for PCT patent application Serial No. PCT/CN2022/078687, filed on Mar. 1, 2022, which claims priority to the Chinese patent application No. 202110316136.3 entitled "alignment target and four-wheel alignment system" filed on Mar. 24, 2021, to the China National Intellectual Property Administration, the entire contents of which are incorporated herein by reference.

TECHNICAL FIELD

The present application relates to the technical field of vehicle detection devices, particularly to an alignment target and a four-wheel alignment system.

BACKGROUND OF THE INVENTION

After a long time and long mileage running, the relative positions between the wheels of a vehicle will have a certain deviation, which, if not corrected, will not only affect the running performance of the vehicle, but also speed up the wear rate of the system components such as vehicle tires and steering mechanisms. Therefore, it is generally necessary to perform a four-wheel alignment test on the vehicle after the vehicle travels for some time.

In the four-wheel alignment detection of a vehicle, generally a target target is mounted on a hub of the vehicle, and then a position indication pattern on the practice target is collected by an image collection apparatus on a detection device such as a locator so as to acquire the position information of the four wheels and perform corresponding operations. Due to the lack of an effective protective structure for the practice target, it is easy to deform or even break due to vibration, collision, or falling, resulting in product failure and short service life.

SUMMARY OF THE INVENTION

In view of the above problems, embodiments of the present invention provide an alignment target and a four-wheel alignment system that avoid the problem of deformation or even breakage of the target due to vibration, collision, or falling, and prolong the service life of a product.

According to an aspect of the embodiments of the present invention, there is provided an alignment target, including: a target plate, the target plate being provided with a position indication pattern, and the position indication pattern being used for indicating position information of the alignment target: a flexible protective member, the flexible protective member being arranged around the periphery of the target plate: and a housing, the housing comprising a main body portion and a frame arranged around the periphery of the main body portion, the frame enclosing an accommodating space, the target plate and the flexible protective member being disposed in the accommodating space, the flexible protective member being located between the target plate and the housing, and the flexible protective member being used for buffering an interaction force between the housing and target plate.

In an alternative mode, the target plate comprises a support laver, a reflective laver, and a pattern layer located between the support layer and the reflective layer arranged in a stacking manner, wherein the pattern layer is provided with the position indication pattern, and the support layer is located on one face of the pattern layer facing the main body portion; the flexible protective member is provided on the periphery of the target plate in a fitting manner to seal a lamination gap between the support layer, the pattern layer, and the reflective layer.

In an alternative mode, the flexible protective member comprises a first wall and a second wall arranged around the periphery of the first wall: the target plate also has a connecting face facing the main body portion, the first wall is located between the connecting face and the main body portion, and the second wall is located between an outer peripheral wall of the target plate and an inner peripheral wall of the frame.

In an alternative mode, the flexible protective member further comprises a third wall, and the third wall and the first wall are provided opposite at two ends of the second wall, wherein the first wall, the second wall, and the third wall enclose a groove for being in sleeve joint and mating with an edge of the target plate, and the third wall is provided with a receding opening for exposing the position indication pattern.

In an alternative mode, the outer wall face of the frame is further provided with a plurality of anti-collision protrusions, the plurality of anti-collision protrusions being provided around the periphery of the frame.

In an alternative mode, the anti-collision protrusion and the frame are of an integral structure.

In an alternative mode, in a direction perpendicular to a plane of the target plate, the anti-collision protrusion extends in a direction of one side of the target plate toward the main body portion and protrudes out of the frame, and/or the anti-collision protrusion extends in a direction of one side of the main body portion toward the target plate and protrudes out of the frame.

In an alternative mode, it further includes an adhesive member provided on the housing and located in the accommodating space for adhering the housing to the target plate and/or for adhering the housing to the flexible protective member.

In an alternative mode, one face of the main body portion facing the target plate is provided with a plurality of first reinforcing ribs, wherein a plurality of the first reinforcing ribs is arranged in a staggered manner and forms a plurality of accommodating grooves, a part of at least one of the adhesive members is located in the accommodating grooves and is fixedly connected to the main body portion, and another part is located outside the accommodating grooves and is fixedly connected to the target plate and/or the flexible protective member; and/or a reinforcing protrusion is further provided on one face of the main body portion facing away from the accommodating space, and the reinforcing protrusion encloses a closed-loop region on the main body portion.

According to another aspect of the embodiments of the present invention, there is provided a four-wheel alignment system including an image acquisition apparatus and the alignment target, wherein the image acquisition apparatus is configured to acquire the position indication pattern of the alignment target so as to acquire position information of the alignment target according to the position indication pattern.

When the alignment target of the embodiments of the present invention is used, the flexible protective member can play a buffering and protecting function on the target plate, so as to avoid the risk that when the alignment target knocks on the ground due to vibration or falling, the target plate deforms or even breaks due to the rigid collision with the protective shell which would cause product failure and inability to use normally, thus improving the reliability and service life of the product. Furthermore, the structure of the housing, the target plate, and the flexible edge covering structure is simple, and the mounting process is simple and convenient, which is beneficial to reduce the production cost.

The above description is only an overview of the technical schemes of the invention. In order to understand the technical means of the invention more clearly, it can be implemented according to the contents of the description. In order to make the above and other purposes, features, and advantages of the invention more obvious and understandable, specific implementation modes of the invention are listed below.

BRIEF DESCRIPTION OF DRAWINGS

Various other advantages and benefits will become apparent to those of ordinary skill in the art upon reading the following detailed description of the preferred implementation modes. The drawings are only for the purpose of illustrating the preferred implementation modes and are not to be construed as limiting the present invention. Moreover, like reference numerals denote like components throughout the drawings. In the drawings.

Figure 1:
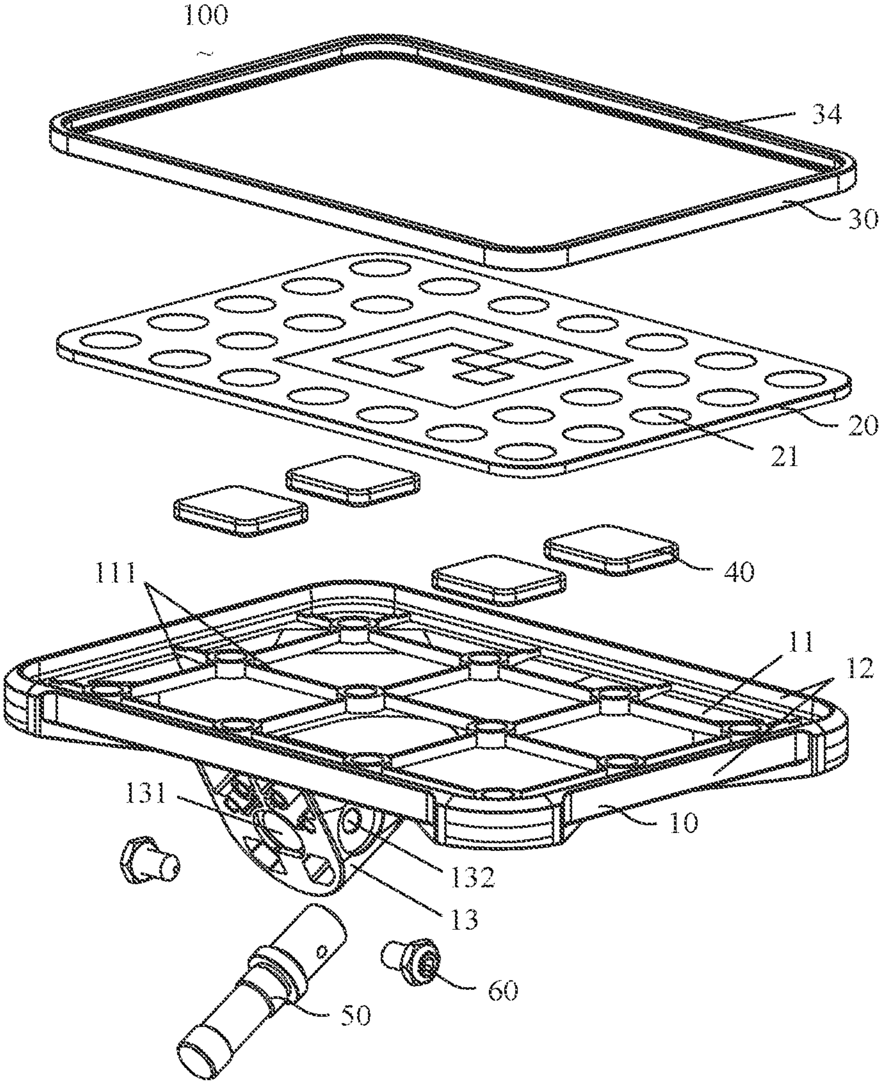
FIG. 1 shows an explosive view of an alignment target from one viewing angle provided by an embodiment of the present invention.

The reference numerals in the detailed description of the invention are as follows:

a housing 10; a main body portion 11; a first reinforcing rib 111; a reinforcing protrusion 112; a second reinforcing rib 113; a frame 12; an anti-collision protrusion 121; a shaft hole 131; a connecting hole 132: a connecting portion 13: a target plate 20; a position indication pattern 21: a support layer 22; a pattern layer 23; a reflective layer 24; a flexible protective member 30: a first wall 31; a second wall 32; a third wall 33; a groove 34; an adhesive member 40; a mounting shaft 50; a limiting hole 51: a fixture 60; and an alignment target 100.

DETAILED DESCRIPTION OF THE INVENTION

The following will provide a detailed description of the embodiments of the technical solution of the present invention in conjunction with the accompanying drawings. The following embodiments are only used to provide a clearer explanation of the technical solutions of the present invention, and therefore are only examples and cannot be used to limit the scope of protection of the present invention.

Figure 2:
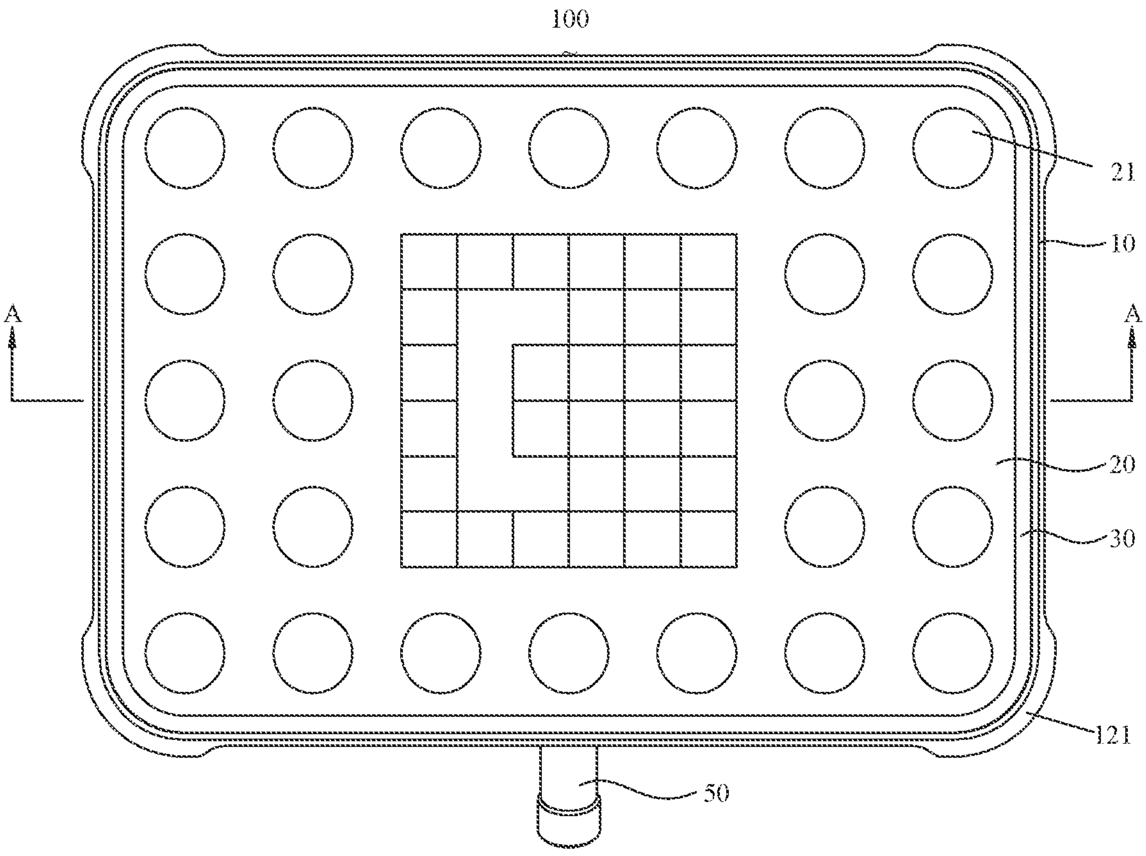
FIG. 2 shows a front view of an alignment target provided by an embodiment of the present invention.
Figure 3:
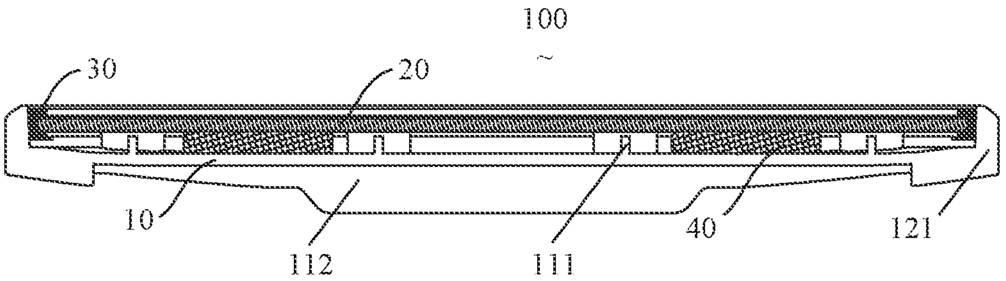
FIG. 3 shows a cross-sectional view of FIG. 2 along the A-A direction.

Referring to FIGS. 1 to 3, FIG. 1 shows an explosive view of an alignment target 100 from one viewing angle provided by an embodiment of the present invention. FIG. 2 shows a front view of an alignment target 100 provided by an embodiment of the present invention. FIG. 3 shows a cross-sectional view of FIG. 2 along the A-A direction.

In the illustrated embodiments, the alignment target 100 includes a housing 10, a target plate 20 mounted on the housing 10, and a flexible protective member 30. The target plate 20 is provided with a position indication pattern 21 for indicating position information for an alignment target. The flexible protective member 30 is arranged around the periphery of the target plate 20, the housing 10 comprises a main body portion 11 and a frame 12 arranged around the periphery of the main body portion 11, the frame 12 enclosing and forming an accommodating space for accommodating the target plate 20, the target plate 20 and the flexible protective member 30 are arranged in the accommodating space, the flexible protective member 30 is located between the target plate 20 and the housing 10, and the flexible protective member 30 is used for buffering the force between the housing 10 and the target plate 20. The position indication pattern can be circular, rectangular, or a combination thereof, and can also be other patterns, such as a QR code, which can be used for a detection device to acquire position information of the alignment target via the image acquisition apparatus.

In the alignment target 100 of the present embodiment, the target plate 20 is mounted in the housing 10 by providing the flexible protective member 30 around the periphery of the target plate 20 and mounting the flexible protective member 30 in the accommodating space formed by one round of the frame 12 around the periphery of the main body portion 11. Since the flexible protective member 30 is located between the target plate 20 and the housing 10 and serves to buffer the force between the housing 10 and the target plate 20, when the alignment target 100 is in use, the flexible protective member 30 can protect the target plate 20. When the alignment target 100 knocks on the ground due to vibration or falling, the risk that the target plate 20 deforms or even breaks due to rigid collision with the protective shell which would otherwise cause product failure and inability to use normally can be reduced, and the reliability and service life of the product can be improved. Furthermore, the structure of the housing 10, the target plate 20, and the flexible edge covering structure is simple, and the mounting process is simple and convenient, which is beneficial to reduce the production cost.

In some embodiments, the flexible protective member 30 may also be used to provide a pressing force of the target plate 20 along the inner peripheral wall of the frame 12 toward the outer peripheral wall of the target plate 20. That is, in a direction parallel to the plane of the target plate 20, a portion of the flexible protective member 30 between the inner peripheral wall of the target plate 20 and the inner peripheral wall of the frame 12 is in pressing contact with the inner peripheral wall of the target plate 20 and the inner peripheral wall of the frame 12, respectively, so that the target plate 20 can be fixed in the accommodating space by the elastic force of the flexible protective member 30.

Figure 4:
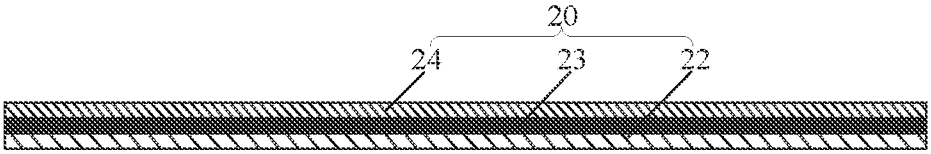
FIG. 4 shows a schematic diagram of a cross-sectional structure of a target plate provided by an embodiment of the present invention.

Referring to FIGS. 2 to 4, FIG. 4 is a schematic cross-sectional structural view illustrating the target plate 20 according to an embodiment of the present invention. In the specific illustrated embodiment, the target plate 20 comprises a support layer 22, a pattern layer 23, and a reflective layer 24 arranged in a stack. The pattern layer 23 is located between the support layer 22 and the reflective layer 24, the pattern layer 23 is provided with a position indication pattern 21, and the support layer 22 is located on one face of the pattern layer 23 facing the main body portion 11. The flexible protective member 30 is fitted to the periphery of the target plate 20 to seal the lamination gap between the support layer 22, the pattern layer 23, and the reflective layer 24.

The support layer 22 can be made of a glass material, wherein the glass can be organic glass or inorganic glass. It could be understood that the support layer 22 can also be made of other materials into a plate-shaped structural member with a certain flatness to provide a flat support plane for the reflective layer 24 and pattern layer 23. The reflective layer 24 may be made of a transparent material, such as transparent plastic, glass, etc. The pattern layer 23 may be a pattern printed on one face of the reflective layer 24 facing the support layer 22, or a pattern printed on one face of the support layer 22 facing the reflective layer 24. The printing mode can be silk screen, spray printing, and other modes, which is not specifically limited herein. Of course, the pattern layer 23 may also be a sheetbody member printed with a pattern, such as a paper sheet or the like.

In this embodiment, the target plate 20 is provided with a layered structure formed by superposing the support layer 22, the pattern layer 23, and the reflective layer 24, and the flexible protective member 30 is fitted around the periphery of the target plate 20, so that the flexible protective member 30 can seal the lamination gap between the support layer 22, the pattern layer 23, and the reflective layer 24. At that, external water vapor cannot easily enter between the lamination layers of the target plate 20, thereby preventing pattern damping which would otherwise cause the product to not function properly.

Figure 5:
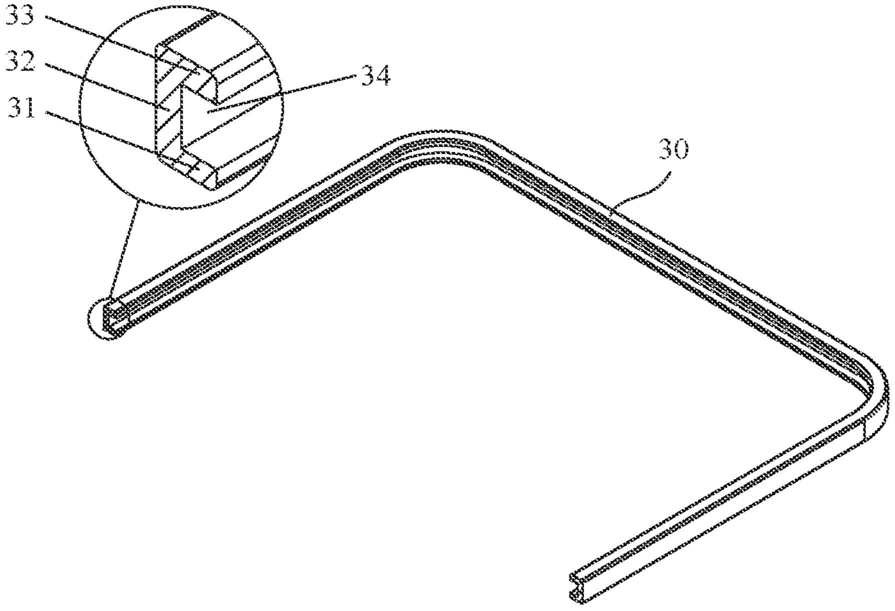
FIG. 5 shows a three-dimensional cross-sectional view of a flexible protective member provided by an embodiment of the present invention.

Referring to FIG. 5 in conjunction with FIGS. 1-4, FIG. 5 illustrates a three-dimensional cross-sectional view of a flexible protective member 30 provided by an embodiment of the present invention. In the specific illustrated embodiment, the flexible protective member 30 includes a first wall 31 and a second wall 32 provided around the periphery of the first wall 31. The target plate 20 also has a connecting face facing the main body portion 11, the first wall 31 is located between the main body portion 11 and the connecting face, and the second wall 32 is located between the outer peripheral wall of the target plate 20 and the inner peripheral wall of the frame 12. Specifically, the connecting face may be one face of the support layer 22 facing the main body portion 11.

The flexible protective member 30 is provided with the first wall 31 and the second wall 32. Since the first wall 31 is located between the main body portion 11 and the connecting face of the target plate 20 facing the main body portion 11, the first wall 31 can be used to buffer the force between the main body portion 11 and the target plate 20, and the second wall 32 is located between the outer peripheral wall of the target plate 20 and the inner peripheral wall of the frame 12, so that the second wall 32 can be used to buffer the action between the target plate 20 and the frame 12, thereby avoiding rigid collision between the housing 10 and the target plate 20.

With continued reference to FIGS. 1 to 5, in the specific illustrated embodiments, the flexible protective member 30 further comprises a third wall 33. The third wall 33 and the first wall 31 are oppositely disposed at two ends of the second wall 32, and the first wall 31, the second wall 32, and the third wall 33 enclose a groove 34 for being in sleeve joint and mating with the edge of the target plate 20, and the third wall 33 is provided with a receding opening for exposing the position indication pattern 21.

The flexible protective member 30 is in sleeve joint with the peripheral edge of the target plate 20 via a groove 34, so that the first wall 31 of the flexible protective member is fitted with one face (the connecting face) of the target plate 20 facing the main body portion 22, the second wall 32 is fitted with the peripheral wall of the target plate 20, and the third wall 33 is fitted with one face of the target plate 20 facing the outside of the accommodating space.

In this embodiment, the edge portion of the target plate 20 is sleeved in the groove 34 enclosed by the third wall 33 and the first wall 31 in the inner peripheral wall of the second wall 32, so that the flexible protective member 30 plays the role of edge covering on the target plate 20, and the waterproof performance of the flexible protective member 30 is improved; at the same time, the first wall 31, the second wall 32, and the third wall 33 of the flexible edge covering can all play the role of protecting the target plate 20 in all directions: in this way, the flexible protective member 30 and the target plate 20 can be sleeved and matched, and the assembly and disassembly are convenient.

Figure 6:
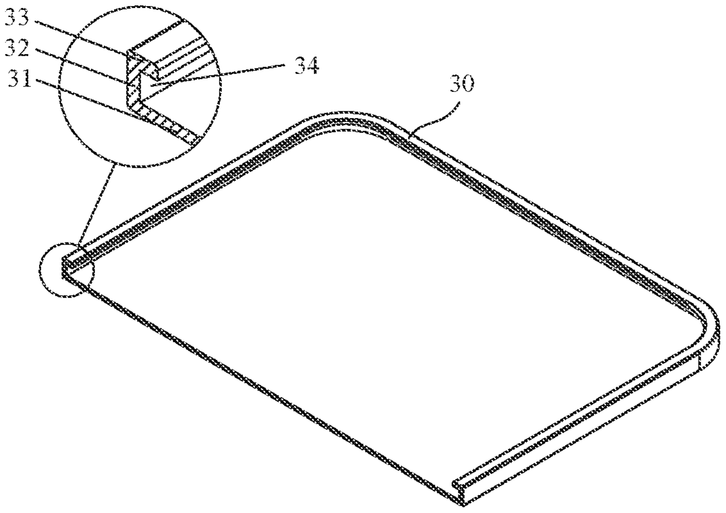
FIG. 6 shows a three-dimensional cross-sectional view of a flexible protective member provided by another embodiment of the present invention.

In some embodiments, the first wall 31 may also be provided with a receding opening of the same size as the third wall 33, such that the flexible protective member 30 forms a closed ring-like structure adapted to the peripheral wall of the target plate 20. It needs to be noted that the ring-like structure is not specifically circular, but rather has a ring-like structure, such as the rectangular ring-like structure shown in the figures. Of course, in some other embodiments, the first wall 31 may not be provided with a receding opening, as shown in FIG. 6. FIG. 6 shows a three-dimensional cross-sectional view of a flexible protective member 30 provided by another embodiment of the present invention.

Referring back to FIGS. 1 to 3, in the specific illustrated embodiment, the outer wall face of the frame 12 is provided with a plurality of anti-collision protrusions 121 disposed around the periphery of the frame 12. The anti-collision protrusion 121 serves to reduce the possibility that the main body portion 11 of the housing 10 and other portions of the frame 12 collide with the outside.

As an example, when the alignment target 100 falls on the ground, the anti-collision protrusion 121 may collide with the ground first, so that the anti-collision protrusion 121 consumes most of the impact force caused by the collision, thereby reducing the probability that the main body portion 11 and other portions of the frame 12 collide with the ground and are damaged, reducing the acting force between the housing 10 and the target plate 20 due to the collision, and reducing the damage to the target plate 20.

In the specific illustrated embodiment, the anti-collision protrusion 121 may be made of a hard material, such as a metal material such as copper, iron, aluminum, alloys thereof, or other cemented carbide materials. Of course, the anti-collision protrusion 121 can also be made of other hard materials with good structural strength, such as PC, PET, and other hard plastics.

This embodiment can effectively reduce the damage to the anti-collision protrusion 121 due to the collision by using the anti-collision protrusion 121 made of a hard material to have good structural strength.

Preferably, the anti-collision protrusion 121 can be made of lightweight metals with light weight, and hardness such as aluminum or aluminum alloy.

In other embodiments, the anti-collision protrusions 121 may be made of a flexible material, such as rubber or the like, so that the anti-collision protrusions 121 may buffer the acting force during the collision and reduce damage to the target plate 20 when the collision force is transmitted to the target plate 20 by the elasticity of the flexible material, thereby preventing the target plate 20 from being deformed or damaged due to the collision.

In the specific illustrated embodiment, the anti-collision protrusions 121 are of an integral structure with the frame 12 to enhance the structural strength of the anti-collision protrusions 121.

It should be understood by those skilled in the art that in other embodiments the anti-collision protrusions 121 may not be of an integral structure with the frame 12.

In some embodiments, in a direction perpendicular to the plane of the target plate 20, the anti-collision protrusion 121 extends in a direction toward one side of the main body portion 11 along the target plate 20 and protrudes out of the frame 12, and/or the anti-collision protrusion 121 extends in a direction toward one side of the target plate 20 along the main body portion 11 and protrudes out of the frame 12.

That is, in the direction perpendicular to the connecting face of the target plate 20, the anti-collision protrusion 121 can protrude towards one side of the target plate 20 towards the main body portion 11, or the anti-collision protrusion 121 can protrude along one side of the main body portion 11 towards the target plate 20, or the anti-collision protrusion 121 can protrude towards one side of the target plate 20 towards the main body portion 11 while the anti-collision protrusion 121 can protrude along one side of the main body portion 11 towards the target plate 20.

In the case where the anti-collision protrusion 121 extends along the direction of the target plate 20 toward the main body portion 11 and protrudes out of the frame, the portion of the anti-collision protrusion 121 extending and protruding in the direction will collide with the outside first, so that the probability of one side of the main body portion 11 facing away from the accommodating space colliding with the outside can be reduced; similarly, in the case where the collision-preventing protrusion 121 extends in the direction of the main body portion 11 toward the target plate 20 and protrudes out of the frame, the portion of the anti-collision protrusion 121 extending and protruding in this direction will collide with the outside first, thereby reducing the probability that the target plate 20 and other portions of the frame 12 collide with the outside on the same side as the direction of the main body portion 11 towards the target plate 20. In this way, the anti-collision protrusion 121 can also play a role of anti-collision protection for the main body portion 11, the frame 12, and the target plate 20 of the alignment target 100 in the direction perpendicular to the target plate 20.

Figure 7:
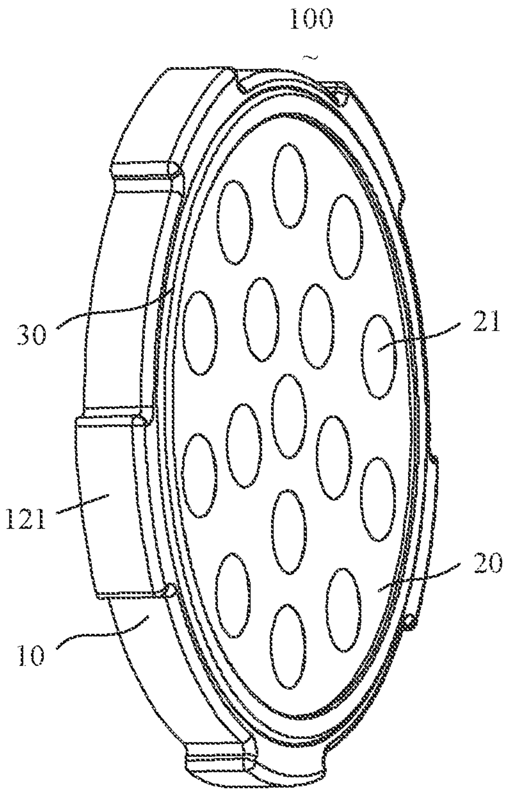
FIG. 7 shows a three-dimensional view of an alignment target in another embodiment of the present invention.
Figure 8:
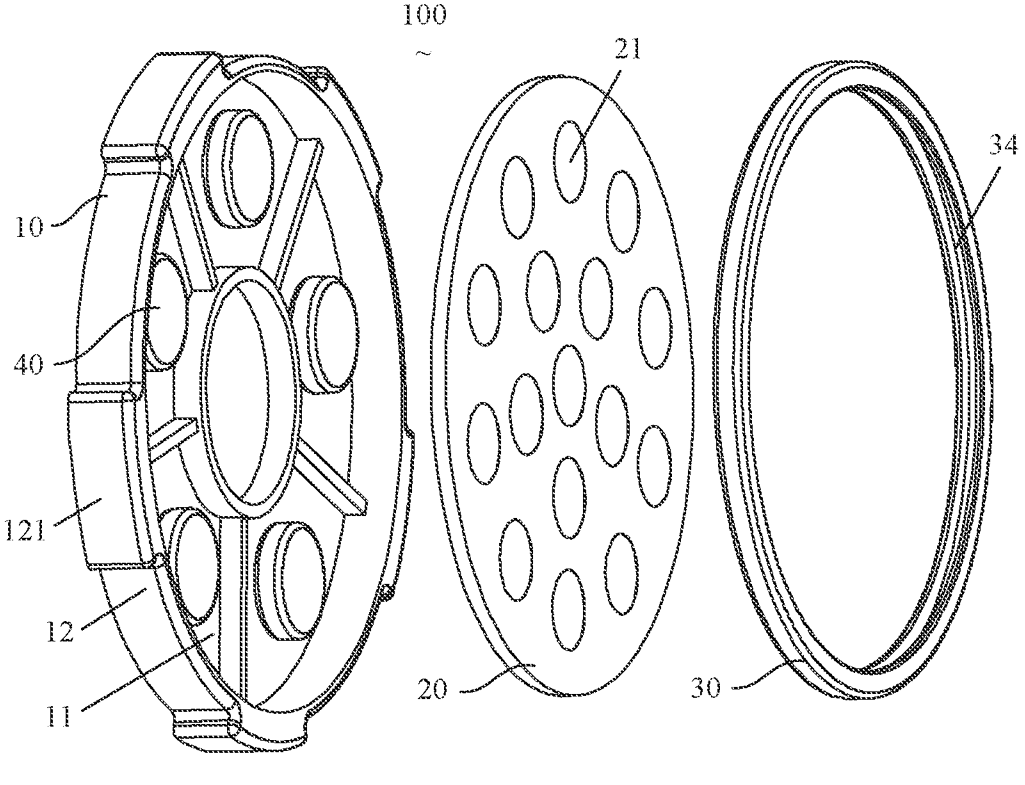
FIG. 8 shows an explosive view of an alignment target in another embodiment of the present invention.

Referring to FIGS. 7 and 8 in combination with FIGS. 1 and 2, FIG. 7 shows a three-dimensional view of an alignment target 100 in another embodiment of the present invention, and FIG. 8 shows an explosive view of an alignment target 100 in another embodiment of the present invention. In the specific illustrated embodiment, the housing 10 is polygonal, circular, or elliptical. That is, the outer shape contour of the housing 10 has a polygonal contour structure, or a circular or elliptical contour structure.

As an example, when the housing 10 is rectangular, the frame 12 is a rectangular frame. The target plate 20 can also be a rectangular plate, the flexible protective member 30 can also be a square ring structure adapted to the peripheral wall of the target plate 20, and the anti-collision protrusion 121 is provided at a corner of the peripheral wall of the frame 12.

In another example, when the housing 10 is circular, the frame 12 is a circular ring-shaped frame. The target plate 20 can be a circular plate, the flexible protective member 30 can also be a circular ring structure adapted to the shape of the peripheral wall of the target plate 20, and the anti-collision protrusions 121 are uniformly arranged around one round of the peripheral wall of the frame 12.

It needs to be noted that when the housing 10 has a polygonal shape, the housing 10 may have a regular polygonal shape, such as a square shape, a regular pentagonal shape, or an irregular polygonal shape. For example, a rectangular shape may be a regular polygonal shape, or an irregular polygonal shape. The above-mentioned shapes of the housing 10, the target plate 20, and the flexible protective member 30 are merely examples. There is no necessary correlation between the specific shape of the housing 10 and the specific shapes of the target plate 20 and the flexible protective member 30. The housing 10, the target plate 20, and the flexible protective member 30 can respectively have different shape structures.

In some embodiments, the housing 10 and the anti-collision protrusion 121 are made of the same or different materials.

Referring back to FIGS. 1 to 4, in the specific illustrated embodiments, the alignment target 100 further includes an adhesive member 40 disposed on the housing 10 and positioned within the accommodating space. The adhesive member 40 is used for adhering the housing 10 to the target plate 20 and/or for adhering the housing 10 to the flexible protective member 30.

That is, the adhesive member 40 may adhesively secure the housing 10 to the target plate 20, or the adhesive member 40 may adhesively secure the housing 10 to the flexible protective member 30. Or the adhesive member 40 adhesively secures the alignment target 100 to the housing 10 and adhesively secures the flexible protective member 30 to the housing 10 at the same time. Here, it needs to be noted that since the flexible protective member 30 itself has an elastic force and is provided around the periphery of the target plate 20, in the case where the adhesive member 40 only adheres and secures the housing 10 and the flexible protective member 30, the flexible protective member 30 can also secure the target plate 20 in the housing 10 by its own elastic force.

By providing the adhesive member 40 in this example, the target plate 20 and the flexible protective member 30 can be mounted and fixed in the accommodating space of the housing 10 by means of an adhesive manner. This connecting manner is simple and convenient, with good securing effect, convenient mounting, and low cost.

Specifically, one end of the adhesive member 40 is connected to the main body portion 11, and the other end of the adhesive member 40 is connected to the target plate 20 and/or the flexible protective member 30.

As an example, in the case where the first wall 31 of the flexible protective member 30 is not provided with a receding opening, one end of the adhesive member 40 is connected to the main body portion 11, and the other end of the adhesive member 40 is connected to one face of the first wall 31 of the flexible protective member 30 facing the main body portion 11. With regard to the case where the flexible protective member 30 is provided with a receding opening, one end of the adhesive connecting member is connected to the main body portion 11, and the other end passes through the receding opening of the first wall 31 and is fixedly connected to the connecting face of the target plate 20 facing the main body portion 11 (namely, the face of the support layer 22 facing the main body portion 11).

It could be understood that in other embodiments, the adhesive member 40 may also be located between the second wall 32 of the flexible protective member 30 and the inner peripheral wall of the frame 12 to fixedly connect the second wall 32 of the flexible protective member 30 to the frame 12 of the housing 10.

In the specific embodiment shown in the figures, a plurality of first reinforcing ribs 111 is provided on one face of the main body portion 11 facing the target plate 20, the plurality of first reinforcing ribs 111 is arranged alternately and forms a plurality of accommodating grooves, a portion of at least one adhesive member 40 is located in the accommodating grooves and fixedly connected to the main body portion 11, and another portion of at least one adhesive member 40 is located outside the accommodating grooves and fixedly connected to the target plate 20 and/or the flexible protective member 30.

That is, the number of the adhesive members 40 may be less than or equal to the number of the accommodating grooves, for example, the number of the accommodating grooves may be 6, and the number of the adhesive members 40 may be 4, and the adhesive members 40 placed in that accommodating groove may be arranged according to actual needs, which is not specifically limited herein.

The present embodiment improves the structural strength of the main body portion 11 by providing a plurality of first reinforcing ribs 111 on one face of the main body portion 11 located in the accommodating space, which is beneficial for its lightweight design under certain structural strength requirements.

Figure 9:
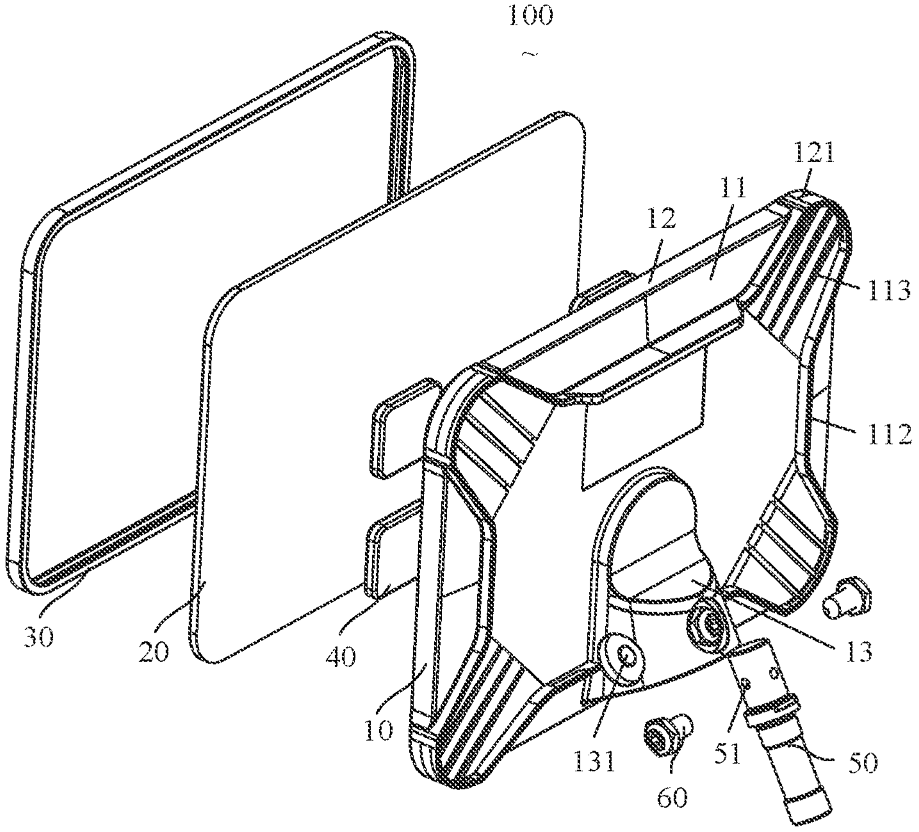
FIG. 9 shows an explosive view from another viewing angle of an alignment target in an embodiment of the present invention.

Referring to FIG. 9 in conjunction with FIG. 1, FIG. 9 shows an explosive view from another viewing angle of an alignment target 100 in an embodiment of the present invention. In the embodiment shown in the figures, one face of the main body portion 11 facing away from the accommodating space is further provided with a reinforcing protrusion 112, and the reinforcing protrusion 112 encloses a closed-loop region on the main body portion 1.

In the closed-loop region, when the housing 10 collides with the outside, the probability of the collision between the reinforcing protrusion 112 and the outside occurring first is relatively high. Therefore, the reinforcing protrusion 112 has a certain protective effect on the part of the main body portion 11 in the closed-loop region.

Specifically, the reinforcing protrusion 112 may be connected to the anti-collision protrusion 121, that is, the reinforcing protrusion 112 connects a plurality of the anti-collision protrusions 121 in sequence along the circumferential direction of the main body portion 11, and a plurality of second reinforcing ribs 113 is further provided side by side at a position near the anti-collision protrusion 121 in the closed-loop region to improve the structural strength of the housing 10 at a position adjacent to the anti-collision protrusion 121.

In some embodiments, the adhesive member 40 is made of a flexible material. As an example, the adhesive member 40 may be an adhesive glass glue mat made of a glass glue material, and the glass glue has a strong adhesive property to components made of metal, glass, etc.; therefore, for the housing 10 being made of a metal material and the support layer 22 of the target plate 20 being made of a glass material and having a good flatness, the glass glue mat can be directly bonded and fixed to the main body portion 11 and the target plate 20, respectively.

Of course, in other embodiments, the adhesive member 40 may be made of other flexible materials, such as a silicone mat made of a silicone material.

It needs to be noted that when the adhesive member 40 is made of a flexible material, it means that the main material from which the adhesive member 40 is made is a flexible material. In order to increase the adhesiveness of the adhesive member 40, other materials that can increase the adhesiveness, such as an adhesive agent or the like, may be added to the flexible material.

In this embodiment, the adhesive member 40 is made of a flexible material so that, in addition to fixing the flexible protective member 30 and the target plate 20 in the housing 10, the adhesive member 40 can buffer the acting force between a part of the housing 10 and the target plate 20 by its elastic property in the event of collision or vibration, thereby protecting the target plate 20 and improving service life thereof.

In the specific embodiment shown in the figure, the alignment target 100 further mounts a shaft 50, one side of the main body portion 11 facing away from the accommodating groove is further provided with a connecting portion 13, the connecting portion 13 is provided with a shaft hole 131, one end of the mounting shaft 50 is fixed in the shaft hole 131, the other end of the mounting shaft 50 is located outside the shaft hole 131, and the other end of the mounting shaft 50 is used for fixed connection of an external connecting member. For example, in use, the mounting shaft 50 is fixedly connected by a hub clamp so that the alignment target 100 is mounted and fixed to the hub of a vehicle. The connecting portion 13 may be located in a closed loop region of the main body portion 11.

In the specific illustrated embodiment, the mounting shaft 50 is removably connected in the shaft hole 131. Specifically, the alignment target 100 further comprises a fixture 60. The fixture 60 is a conventional fixture 60 such as a bolt; the connecting portion 13 is further provided with at least one connecting hole 132 in communication with the shaft hole 131; the mounting shaft 50 is provided with a limiting hole 51 at a position corresponding to the connecting hole 132 at one end of the shaft hole 131; one end of the fixture 60 is screwed with the connecting hole 132 and inserted into the limiting hole 51 so as to fix the mounting shaft 50 to the connecting portion 13 of the housing 10. In this connecting mode, the mounting shaft 50 and the housing 10 are easy to assemble and disassemble and easy to use.

In another aspect of the present application, there is also provided a four-wheel alignment system including an image acquisition apparatus and an alignment target 100. The image acquisition apparatus is used for acquiring the position indication pattern 21 on the target plate 20 of the alignment target 100 to acquire position information of the alignment target 100 according to the position indication pattern 21.

The image acquisition apparatus can be a camera in a four-wheel aligner, and the number of the alignment targets 100 is four. When in use, the four alignment targets 100 are respectively mounted in four tires of a vehicle, and the image acquisition apparatus obtains the position information of the alignment targets 100 by shooting the acquired position indication pattern 21 of the alignment target 100 and subjecting the same to the processing by a computer of the four-wheel aligner so as to obtain relevant parameter information of four wheels of the vehicle, such as a reverse caster (angle), a king pin inclination (angle), a toe-in of front wheel, a toe-in of a rear wheel, etc.

It needs to be noted that, unless otherwise stated, the technical or scientific terms used in the embodiments of the present invention should have the ordinary meaning understood by those skilled in the art to which the embodiments of the present invention belong.

In the description of the embodiments of the present invention, the orientation or positional relationships indicated by the technical terms "inner", "outer" etc. are based on the orientation or positional relationship shown in the drawings, and are only for the convenience of describing the embodiments of the invention and simplifying the description, rather than indicating or implying that the referred device or element must have a specific orientation, or be constructed and operated in a specific orientation, and therefore cannot be construed as a limitation of the embodiments of the present invention.

In addition, the technical terms "first", "second", etc. are for descriptive purposes only and are not to be construed as indicating or implying relative importance or implicitly indicating the number of technical features indicated. In the description of the embodiments of the present invention, the meaning of "a plurality of" refers to two or more, unless otherwise specifically defined.

In the description of the embodiments of the present invention, unless otherwise clearly specified and limited, the technical terms "mount", "connected", "connect", "fix" and other terms should be understood in a broad sense. For example, it can be a fixed connection or a detachable connection, or integrated: it can also be a mechanical connection, an electrical connection; it can be directly connected or indirectly connected through an intermediate medium, and it can be the internal communication of two elements or the interaction relationship between two elements. For a person of ordinary skills in the art, the specific meaning of the above-mentioned terms in the embodiments of the present invention can be understood according to specific situations.

Finally, it should be noted that: the above embodiments are provided only to illustrate the technical solutions of the present invention, not to limit it: while the present invention has been described in detail with reference to the foregoing embodiments, those of ordinary skills in the art should understand that: the technical solutions disclosed in the above-mentioned embodiments can still be modified, or some or all of the technical features can be replaced by equivalents; such modifications and substitutions do not separate the essence of the corresponding technical solutions from the scope of technical solutions of the various embodiments of the present invention, but should be covered within the scope of the claims and description of the present invention. In particular, the technical features mentioned in the various embodiments can be combined in any manner as long as there is no structural conflict. The present invention is not limited to the particular embodiments disclosed herein, but includes all technical solutions falling within the scope of the appended claims.

The invention claimed is:

1. An alignment target, comprising:

a target plate, the target plate being provided with a position indication pattern, and the position indication pattern being used for indicating position information of the alignment target, wherein the target plate comprises a support layer, a reflective layer, and a pattern layer located between the support layer and the reflective layer arranged in a stacking manner, wherein the pattern layer is provided with the position indication pattern, and the support layer is located on one face of the pattern layer facing the main body portion;

a flexible protective member, the flexible protective member being arranged around a periphery of the target plate, wherein the flexible protective member comprises a first wall and a second wall arranged around the periphery of the first wall, the flexible protective member is provided on the periphery of the target plate in a fitting manner to seal a lamination gap between the support layer, the pattern layer, and the reflective layer;

the target plate also has a connecting face facing the main body portion, the first wall is located between the connecting face and the main body portion, and the second wall is located between an outer peripheral wall of the target plate and an inner peripheral wall of the frame; and a housing, the housing comprising a main body portion and a frame arranged around the periphery of the main body portion, the frame enclosing an accommodating space, the target plate and the flexible protective member being disposed in the accommodating space, the flexible protective member being located between the target plate and the housing, and the flexible protective member being used for buffering an interaction force between the housing and target plate.

2. The alignment target according to claim 1, wherein the flexible protective member further comprises a third wall, and the third wall and the first wall are provided opposite at two ends of the second wall, wherein the first wall, the second wall, and the third wall enclose a groove for being in sleeve joint and mating with an edge of the target plate, and the third wall is provided with a receding opening for exposing the position indication pattern.

3. The alignment target according to claim 1, wherein an outer wall face of the frame is further provided with a plurality of anti-collision protrusions, the plurality of anti-collision protrusions being provided around the periphery of the frame.

4. The alignment target according to claim 3, wherein the anti-collision protrusion and the frame are of an integral structure.

5. The alignment target according to claim 3, wherein in a direction perpendicular to a plane of the target plate, the anti-collision protrusion extends in a direction of one side of the target plate toward the main body portion and protrudes out of the frame, and/or the anti-collision protrusion extends in a direction of one side of the main body portion toward the target plate and protrudes out of the frame.

6. The alignment target according to claim 1, further comprising an adhesive member provided on the housing and located in the accommodating space for adhering the housing to the target plate and/or for adhering the housing to the flexible protective member.

7. The alignment target according to claim 6, wherein one face of the main body portion facing the target plate is provided with a plurality of first reinforcing ribs, wherein a plurality of the first reinforcing ribs is arranged in a staggered manner and forms a plurality of accommodating grooves, a part of at least one of the adhesive members is located in the accommodating grooves and is fixedly connected to the main body portion, and another part is located outside the accommodating grooves and is fixedly connected to the target plate and/or the flexible protective member; and/or a reinforcing protrusion is further provided on one face of the main body portion facing away from the accommodating space, and the reinforcing protrusion encloses a closed-loop region on the main body portion.

8. A four-wheel alignment system, comprising: an image acquisition apparatus and an alignment target, wherein the image acquisition apparatus is configured to acquire the position indication pattern of the alignment target so as to acquire position information of the alignment target according to the position indication pattern; and wherein the alignment target comprises:

a target plate, the target plate being provided with a position indication pattern, and the position indication pattern being used for indicating position information of the alignment target, wherein the target plate comprises a support layer, a reflective layer, and a pattern layer located between the support layer and the reflective layer arranged in a stacking manner, wherein the pattern layer is provided with the position indication pattern, and the support layer is located on one face of the pattern layer facing the main body portion;

a flexible protective member, the flexible protective member being arranged around a periphery of the target plate, wherein the flexible protective member comprises a first wall and a second wall arranged around the periphery of the first wall, the flexible protective member is provided on the periphery of the target plate in a fitting manner to seal a lamination gap between the support layer, the pattern layer, and the reflective layer;

the target plate also has a connecting face facing the main body portion, the first wall is located between the connecting face and the main body portion, and the second wall is located between an outer peripheral wall of the target plate and an inner peripheral wall of the frame; and a housing, the housing comprising a main body portion and a frame arranged around the periphery of the main body portion, the frame enclosing an accommodating space, the target plate and the flexible protective member being disposed in the accommodating space, the flexible protective member being located between the target plate and the housing, and the flexible protective member being used for buffering an interaction force between the housing and target plate.

* * * * *